United States Patent
Greaves (10) Patent No.: US 11,303,845 B2
(45) Date of Patent: Apr. 12, 2022

(54) VIDEO CONTENT AUTHENTICATION

(71) Applicant: Alex Greaves, San Francisco, CA (US)

(72) Inventor: Alex Greaves, San Francisco, CA (US)

(73) Assignee: Alex Greaves, San Francisco, CA (US)

( * ) Notice: Subject to any disclaimer, the term of this patent is extended or adjusted under 35 U.S.C. 154(b) by 349 days.

(21) Appl. No.: 16/666,767

(22) Filed: Oct. 29, 2019

(65) Prior Publication Data

US 2021/0127085 A1   Apr. 29, 2021

(51) Int. Cl.
| | |
|---|---|
| *H04N 5/913* | (2006.01) |
| *G06F 21/16* | (2013.01) |
| *G06T 1/00* | (2006.01) |
| *H04L 9/32* | (2006.01) |
| *G06F 21/44* | (2013.01) |

(52) U.S. Cl.
CPC ............. *H04N 5/913* (2013.01); *G06F 21/16* (2013.01); *G06T 1/005* (2013.01); *H04L 9/3226* (2013.01); *G06F 2221/0737* (2013.01); *H04L 2209/38* (2013.01); *H04N 2005/91335* (2013.01)

(58) Field of Classification Search
CPC .......... H04N 5/913; H04N 2005/91335; G06F 21/16; G06F 2221/0737; G06F 21/44; G06T 1/005; H04L 9/3226; H04L 2209/38; H04L 2209/608; H04L 9/3239
See application file for complete search history.

(56) References Cited

U.S. PATENT DOCUMENTS

| | | | |
|---|---|---|---|
| 10,256,829 B1* | 4/2019 | Bertsch | H04N 21/84 |
| 10,348,505 B1* | 7/2019 | Crawforth | H04L 9/3236 |
| 10,404,467 B1* | 9/2019 | Winarski | H04L 9/0637 |
| 10,554,414 B1* | 2/2020 | Winarski | H04N 21/835 |
| 11,101,995 B1* | 8/2021 | Oliver | H04W 12/63 |
| 2015/0089593 A1* | 3/2015 | Herman | H04L 63/061 726/4 |
| 2018/0068091 A1* | 3/2018 | Gaidar | G06F 21/16 |
| 2018/0069838 A1* | 3/2018 | Lee | G06K 9/00771 |
| 2018/0121635 A1* | 5/2018 | Tormasov | H04L 9/3297 |
| 2018/0255458 A1* | 9/2018 | Villar | H04W 4/80 |
| 2018/0288362 A1* | 10/2018 | Altenburger | H04N 5/913 |
| 2019/0130190 A1* | 5/2019 | Raspotnik, Jr. | G06F 21/53 |
| 2019/0158274 A1* | 5/2019 | Tormasov | G06N 20/00 |
| 2019/0215162 A1* | 7/2019 | Dickenson | H04L 9/3226 |
| 2020/0260147 A1* | 8/2020 | Madisetti | H04N 21/233 |

(Continued)

OTHER PUBLICATIONS

Fake Video Solved; Amber, Part of Unveiled Labs, Inc.; 2019.

(Continued)

*Primary Examiner* — Darren B Schwartz
(74) *Attorney, Agent, or Firm* — Kwan & Olynick LLP (57) ABSTRACT

A recording initiation signal in relation to video content may be received. One or more generated patterns for audio and/or visual watermarking of the video content being may be sent. Cryptographic representations of one or more video content segments may be received. One or more additional video content segments may be received. It may be verified whether the received video content segments correspond to the cryptographic representations of the video content segments. The received video content segments may be processed to analyze whether the watermarking within the received video content segments match the generated patterns sent to the device.

16 Claims, 4 Drawing Sheets

(56) References Cited

U.S. PATENT DOCUMENTS

2020/0275166 A1* 8/2020 Jordan .................. H04L 9/3239
2020/0388091 A1* 12/2020 Ropel ................... H04L 9/0637

OTHER PUBLICATIONS

Korus et al., Neural Imaging Pipelines—the Scourge or Hope of Forensics?; arXiv:1902.10707v1, Feb. 27, 2019.
Newman; A New Tool Protects Videos from Deepfakes and Tampering, 2019.
ProofMode: Verified Visuals (A CameraV-inspired Micro App), Accessed in 2019.

* cited by examiner

VIDEO CONTENT AUTHENTICATION

TECHNICAL FIELD

This disclosure relates generally to the cryptography field, and more specifically to a new and useful system and method for providing authentication of video content in the cryptography field.

BACKGROUND

Within the field of cryptography, significant issues have arisen recently as a result of the increased prominence of so-called "deepfakes" and other forms of video content facilitated by artificial intelligence ("AI") and deep learning algorithms. A "deepfake" is a technique for human image synthesis which involves combining and superimposing existing images and/or videos onto source images and/or videos. This is typically performed using machine learning or deep learning techniques such as generative adversarial networks. Deepfakes are often indistinguishable from authentic, non-manipulated video content to many viewers. As a result, they are becoming a popular method of creating fake news and media content, malicious hoaxes, and other content which can have extremely damaging or disastrous repercussions on a national or global scale.

Many predict that even trained human experts will soon no longer be able to tell whether a video or recording has been doctored. Because technology such as deepfakes are so convincing, the technology involved now calls into question the authenticity of any video or recording. A number of issues could present themselves as a result. For example, trials could become complicated by claims that any incriminating video has been doctored, leveraging a situation in which no foolproof method exists to verify the authenticity of such evidence.

DETAILED DESCRIPTION

The following description of embodiments of the disclosure is not intended to limit the disclosure to these embodiments, but rather to enable any person skilled in the art to make and use this disclosure.

1. Overview

A few attempts to streamline authentication of deepfakes has been made. One is a smart camera approach in which video authenticity technology is built into the camera which recorded the video itself. A digital watermark is placed within the video file that becomes "broken" upon manipulation. While this may be a solution, it will only work on dedicated smart camera devices with the built-in technology, which presents a significant burden to those unable to afford or carry such dedicated devices, and which fails to provide authentication powers in the hands of the users themselves.

Another existing approach is to attach generic signals to a video. When taking a video recording, the device concurrently sends generic auxiliary data (e.g., location, pressure, magnetometer, nearby networks, or any other suitable auxiliary data) which is capable of verifying that the video was recorded at that exact location and exact time. A significant problem with this approach is that a malicious actor can "spoof" the camera feed in order to "capture" a pre-recorded, doctored video, such as via an application designed for such a purpose.

Another existing approach involves video hashing and blockchains. As the user records a video, an application can generate a cryptographic hash of several slices of the video, then add them to a blockchain in real time. This allows a third party to later compute the hashes on the same slices of the video to confirm that the hashes match those in the blockchain. This approach can also run into the same problem as the previous approach, in which a malicious actor can spoof the camera feed to capture a pre-recorded, doctored video.

By contrast, using the disclosed techniques, external input may be added to video content, optionally in real time or substantially real time (e.g., within less than a millisecond less than 0.5 seconds, less than a second, less than 5 seconds, etc.), to provide verification that the video content hasn't been prerecorded or spoofed. Patterns may be generated in a unique way to ensure that no spoofing or other malicious manipulation of video is performed. Independent verification may be provided from outside parties that the video hasn't been altered.

Unlike existing methods, the disclosed techniques allow for a digital watermark or signature for authentication of the video content in such a way that avoids easy spoofing of the watermarking patterns within the video in order for malicious actors to fool the verification systems. Doing so would require extraneous information about the generated watermarking patterns, which would not be present in the original video content. Even if extraneous information is somehow acquired (e.g. through reverse engineering of the watermarking process), attempts to do so would likely differ from the actual watermarking present in the original video and would be detectable.

Figure 2:
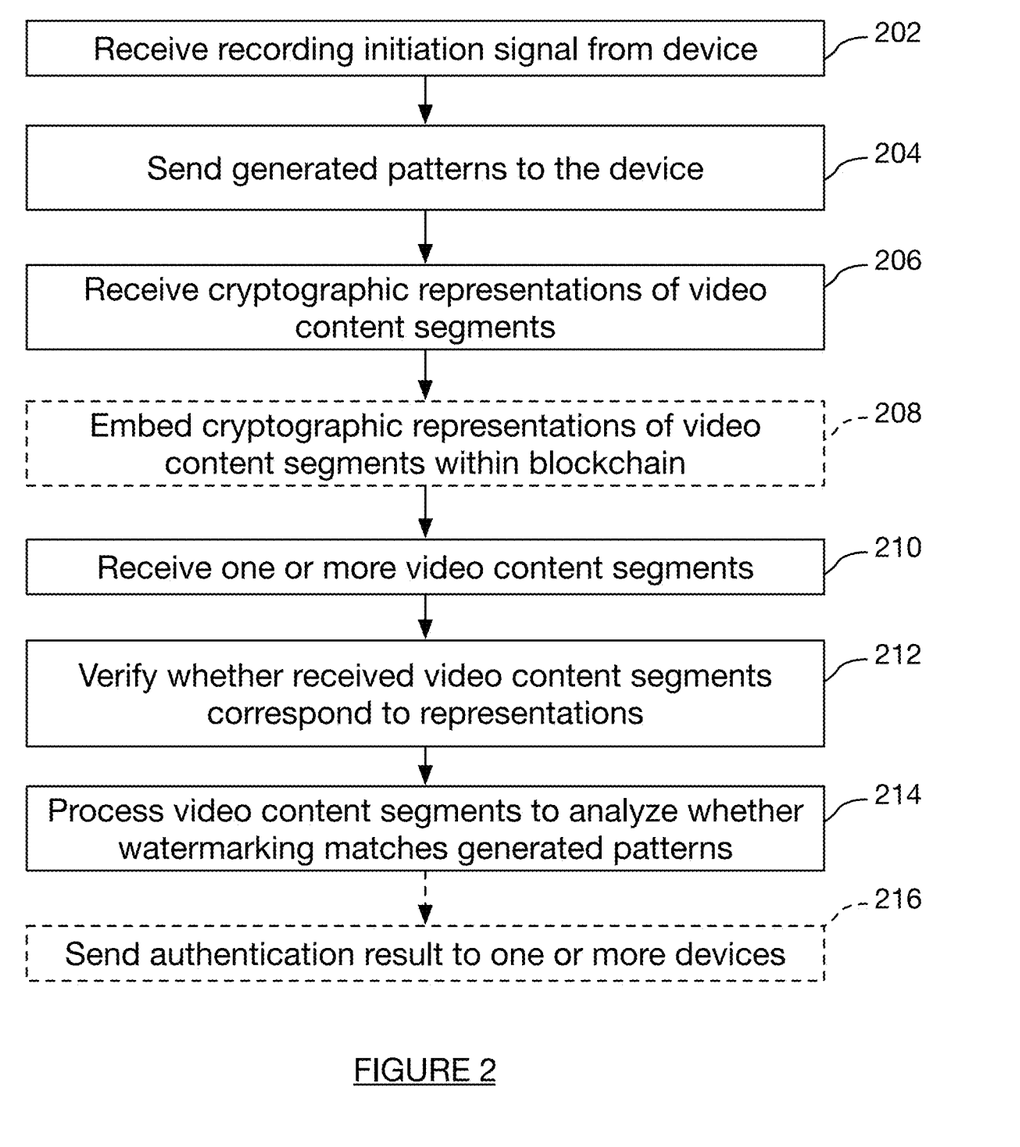
FIG. 2 is a flowchart representation of the video content authentication method, in accordance with some embodiments.

As shown in FIG. 2, the method for video content authentication includes one or more of: receiving a recording initiation signal from a device, sending generated patterns to the device, optionally embedding cryptographic representations of video content segments within a blockchain, receiving one or more video content segments, verifying whether the received video content segments correspond to the representations, processing video content segments to analyze whether the watermarking matches the generated patterns, and optionally, sending an authentication result to one or more devices.

The systems and methods provided herein function to add some external input to video content, optionally in real time or substantially real time, to provide verification that the video content hasn't been prerecorded or spoofed. Patterns are generated, optionally in a unique way, to ensure that no spoofing or other malicious manipulation of video is performed, and to provide independent verification from outside parties that the video hasn't been altered.

All or portions of the method can be performed at a predetermined frequency, performed upon occurrence of an execution event (e.g., upon receiving the recording initiation signal), or performed at any suitable time.

2. Benefits

This method can confer several benefits over conventional gesture recognition methods.

First, the method allows for a digital watermark or signature for authentication of the video content in such a way that avoids easy spoofing of the watermarking patterns within the video in order for malicious actors to fool the verification systems. Doing so would require extraneous information about the generated watermarking patterns, which would not be present in the original video content. Even if extraneous information is somehow acquired (e.g. through reverse engineering of the watermarking process), attempts to do so would likely differ from the actual watermarking present in the original video and would be detectable. The watermarking present within the video is optionally unique compared to all other generated watermarks, due to a wide range of patterns and/or sequences, types, strengths, and other aspects of the watermarking.

Second, no expensive, dedicated smart camera device with built-in verification technology would be required. A number of devices would be already equipped with the technology necessary to achieve authentication of video content according to the systems and methods described herein. For example, almost all smartphones are equipped with the needed technology. This may include, for example, an embedded camera, vibration features, and other potentially necessary or useful features such as location information or gyroscopic sensors.

Third, the systems and methods provide for blockchain authentication, which allows for secure cryptographic verification of the video on the chain in a decentralized and transparent fashion. Any modification or tampering of the original video content will be apparent to all nodes of the blockchain. Cryptographic authentication processes, such as hashing of video content segments, renders reverse-engineering of the video content and its watermarking to be near-impossible, as there's no current way to create a spoof that matches the hash due to its one-way function characteristics. The blockchain allows for a public record that is not spoofable even by the creator or maintainer of the video.

Fourth, the systems and methods provide for a low compute, resource-efficient solution. None of the described techniques require advanced processing that would be out of the capabilities of typical devices (e.g. smartphones) and processing servers which are already standard and ubiquitous.

Fifth, the systems and methods optionally provide for a solution which is capable of producing watermarking and cryptographic authentication of video content in real time or substantially real time upon the system receiving a signal that video recording has been initiated on a device. This provides for a solution which produces generated watermarking patterns that can be quickly added to video content during the recording process without outside parties being able to learn about and spoof the patterns over a longer period of time.

Sixth, the systems and methods provide a way to not only detect fake or doctored videos, but to also affirmatively verify the authenticity of original content. While some systems may employ various techniques to identify fake videos, questions may still remain as to whether any given piece of media is authentic and original. The systems and methods provided herein present a solution that is capable of tracking authenticity upon recording of the video itself.

In addition to these benefits, the systems and methods can confer any number of additional benefits.

2. System

Figure 1:
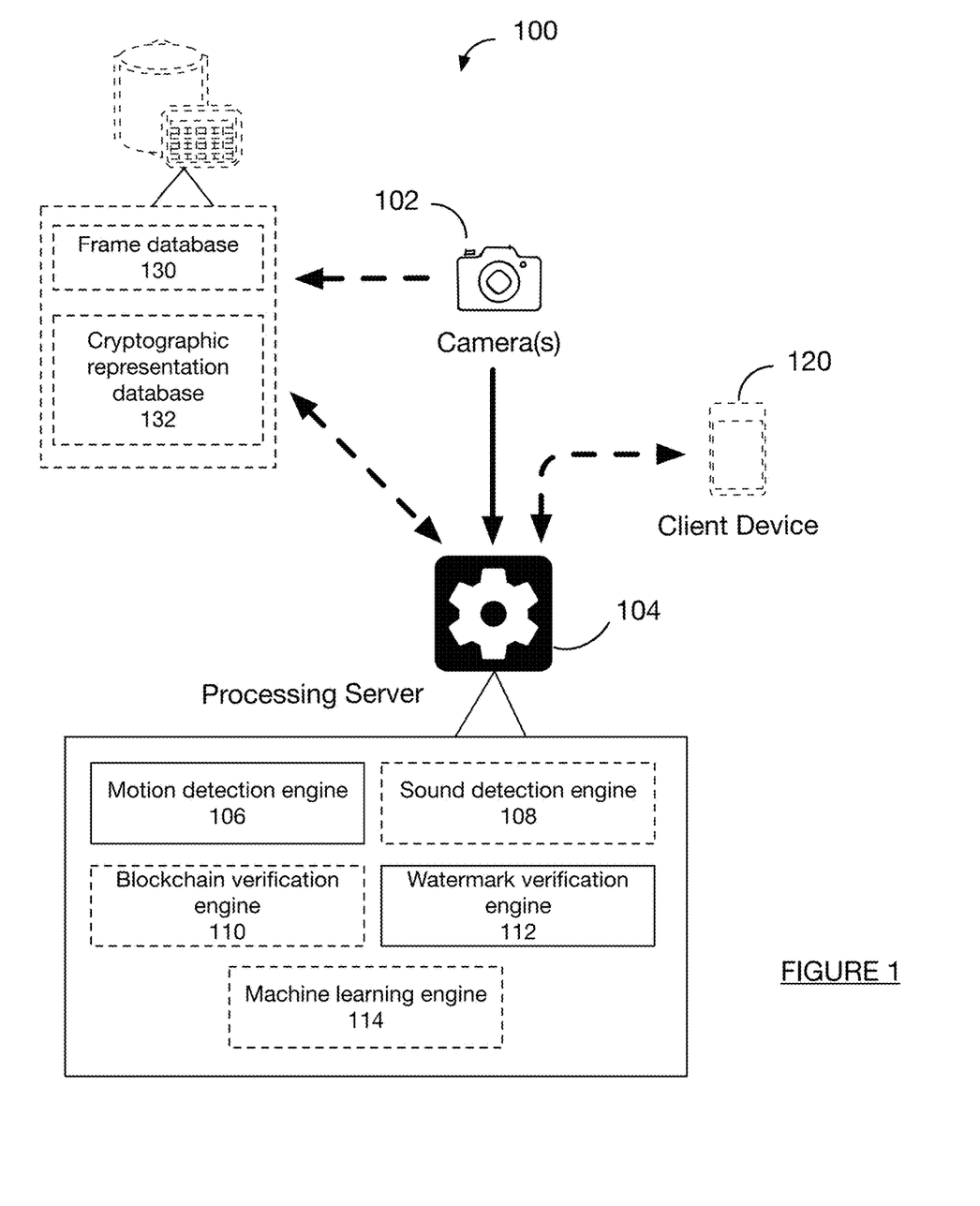
FIG. 1 is a schematic representation of the video content authentication system, in accordance with some embodiments.

As shown in FIG. 1, the video authentication system 100 can include: camera(s) 102, processing server 104, motion detection engine 106, optional sound detection engine 108, optional blockchain verification engine 110, watermark verification engine 112, optional machine learning engine 114, optional client device 120, optional frame database 130, and optional cryptographic representation database 132.

Camera(s) 102 are one or more camera devices. The camera(s) function to capture video and/or audio content of a scene and output the content as a video content file or other recording file. In some embodiments, a single camera is used to capture and output video content; alternatively, two or more cameras can be used, either separately or in conjunction. In some embodiments, the camera(s) can be embedded within a smartphone device or other mobile device. In some embodiments, the camera(s) are embedded within the client device 120.

In some embodiments, the camera(s) can include any basic or advanced camera with the capability to send video content in some fashion to a client device 120 or processing server 104. In some embodiments, the camera includes wireless or wired internet technology capabilities to perform transfer of video content. In some embodiments, the camera includes Bluetooth or other wireless transfer technology to perform transfer of video content.

In some embodiments, the camera records video and outputs single frames from the video in a sequential order. In some embodiments, the camera records video and outputs the frames in real time or substantially real time as a video stream is recorded ("real-time video streaming"). In some embodiments, the camera outputs frames to frame database 130, where the frames are stored, maintained, and can be retrieved. Alternatively, the camera outputs video files or frames to the processing server 104 or client device 120. In some embodiments, video content is sent as output from the camera as raw, uncompressed video files. Alternatively, video content that is sent can be compressed via video compression algorithms or methods, or otherwise modified in order to reduce the video content file size. In some systems, this reduced video content size can lead to more efficient and faster processing within the system.

In some embodiments, the camera can include basic camera functionality along with the capability to output frames to one or more components of system 100. In some embodiments, the camera can be fixed or mounted within a scene. Alternatively, the camera can be free-floating, hand-held, or otherwise non-fixed. In some embodiments, the camera includes lighting components or aspects which provide controlled lighting conditions.

In some embodiments, one or more optional sensors are present, either embedded within, connected to, or external to the camera. The sensors can function to provide information and data regarding the location of the device during recording, gyroscopic information about the position or pose of the camera or device during recording, or any other suitable information. In some embodiments, for example, sensors in conjunction with a camera device can employ simultaneous localization and mapping (SLAM) technology to provide device position and orientation (i.e., a camera pose or SLAM pose) using the camera's recorded output and readings from an embedded accelerometer and gyroscope. In one example, a phone camera or similar mobile device with built-in camera can include various sensors, an accelerometer, a gyroscope, and/or SLAM technology to provide three-dimensional information about a scene in addition to other information.

Optional frame database 130 functions to store and maintain a sequential series of frames representing video content. In some embodiments, the frames are sent to the frame database 130 as output from the camera into a database. Alternatively, the frames are sent from the processing server 104. In some embodiments, frame database 130 can be queried by one or more components of system 100 (e.g., by processing server 104), and specific frames stored in the frame database 130 can be retrieved.

Processing server 104 functions to process video content (or a sequential series of frames representing video content) received as input, perform verification and authentication of video content, and optionally, provide an authentication result to one or more devices. Processing server 104 contains one or more components which can perform tasks related to video content authentication. In some embodiments, the processing server 104 is a computing device or series of networked computing devices capable of processing and computational tasks. In some embodiments, the processing server is located remotely from the camera(s) 102 and/or client device 120. In varying embodiments, the processing server 104 is communicatively coupled with, and capable of sending and/or receiving information from one or more databases (e.g., frame database 130 and/or cryptographic representation database 132), camera(s) 102, and/or client device 120.

Motion detection engine 106 is a component of processing server 104. The motion detection engine 106 functions to run a motion detection algorithm to detect and locate frames of the video where specific forms of motion is detected. In some embodiments, the motion detection engine 106 detects vibration motion as separate and distinct from other forms of motion. In some embodiments, motion detection engine 106 compares a frame received as input to a subsequent or preceding frame in sequential frame order, detects motion (e.g., vibration motion from the camera or device vibrating) from one frame to the next, and outputs detection results of the detected movement. In some embodiments, the motion detection engine detects a specific type, strength, and/or pattern of a vibration or other motion as part of a watermarking or signature within the video content. Methods and embodiments of motion detection are discussed in further detail in the method section below.

Optional sound detection engine 108 is an optional component of processing server 104. The sound detection engine 108 functions to detect one or more distinct or specific sounds within the video content as representative or apparent in the received video content. In some embodiments, the sound detection engine 108 runs a sound detection algorithm or other sound detection process to detect timestamps or other temporal locations in the video where device vibration sound is detected. In some embodiments, the sound detection engine detects a specific type, strength, and/or pattern of a vibration or other motion as part of a watermarking or signature within the video content.

Optional blockchain verification engine 110 is a component of the processing server 104. Blockchain verification engine 110 functions to provide independent verification of the authenticity of video content based on cryptographic representations of the video content uploaded to the blockchain. Such verification will be discussed in greater detail in the method section below.

Watermark verification engine 112 is a component of the processing server 104. Watermark verification engine 112 functions to detect watermark or signature content in video content and compare it to stored watermark or signature patterns generated by the system when the video content was being recorded. Watermark verification methods will be discussed in further detail in the method section below.

Optional machine learning engine 114 is an optional component of the processing server 104. Machine learning engine 114 functions to generate machine learning or deep learning models for various tasks within system 100, train the machine learning or deep learning models, and utilize those models to perform authentication of video content. In some embodiments, the machine learning engine 114 is used to detect doctored or manipulated video content, and other suitable tasks that may be performed within system 100 by machine learning techniques. In some embodiments, the machine learning engine 114 compares video content to authenticated original video content in order to detect whether the video content is fake or doctored video content. Machine learning techniques will be discussed in further detail below.

Optional cryptographic representation database 132 is an optional database that function to store and maintain cryptographic representations of video content. In some embodiments, the cryptographic representation database 132 stores hashes of the video content for retrieval and access by the processing server 104.

Optional client device 120 is a device that sends information to the processing server 104, receives information from the processing server 104, or both. In some embodiments, a client device 120 is a computing device that is local to the camera or includes the camera as a built-in or embedded device. In some embodiments, the client device may be a computer desktop or laptop, mobile phone, virtual reality or augmented reality device, wearable, or any other suitable device capable of sending and receiving information. A client device may include, e.g., one or more components relating to frame processing, video processing, machine learning, motion detection, sound detection, verification, cryptographic processes, or other aspects of system 100. In some embodiments, the client device 120 is a computer device associated with one or more users, organizations, or other entities. In some embodiments, the client device 120 is a networked set of computing devices within a local network.

The system can optionally include one or more chipsets or processing hardware that functions to execute all or a portion of the method. The processing hardware can include one or more: embedded systems, microcontrollers, microprocessors, ASICs, CPUs, GPUs, TPUs, or any other suitable processing system.

3. Method

FIG. 2 is a flowchart representation of the video content authentication method.

At step 202, the system receives a recording initiation signal from a device (e.g., a camera, client device, or other suitable device). The recording initiation signal corresponds to video content being recorded on a camera or device configured for video recording. In some embodiments, the recording initiation signal is sent to a remote processing server. In some embodiments, the recording initiation signal provides additional information about the recording, such as type of recording (e.g. real-time video stream, smartphone camera recording, two-dimensional or three-dimensional video recording, or any other suitable type of recording), and format of recording (e.g., video file format, compressed or uncompressed video file, or other suitable format characteristics). In some embodiments, the recording initiation signal is sent between different components or elements of a single device.

At step 204, in response to the recording initiation signal being received, the system sends one or more generated patterns to the device for audio and/or visual watermarking of the video content being recorded. In some embodiments, the system sends a sequence of patterns which are to appear at some point in the video. In some embodiments, the patterns are vibration patterns, and they are sent to be generated as vibration patterns or instructions to direct the device to vibrate using built-in vibration technology within the device, according to the specified patterns. In some embodiments, the patterns may correlate to specific rhythmic patterns, patterns of intensity, types of movement, or any other suitable way to trigger the device's vibration features in specific or distinct ways. In some embodiments, in response to receiving the patterns, the phone vibrates or otherwise manifests the patterns during the recording of the video. As a result of the vibration or other motion, the camera in the device itself moves when the vibration or motion occurs, which appears in the resulting video. In some embodiments, sound is emitted as a result of the vibration or other motion, and the sound may be audible within the audio track of the video as well. In this way, a live watermark or signature may be left in the video during the recording of the video. In some embodiments, the patterns may be generated in whole or in part according to random and/or pseudorandom elements, methods, or processes.

In some embodiments, the generated patterns are sent to the device in real time or substantially real time concurrent to the video content being recorded by the camera or device. In such a way, the watermark generation can be performed in parallel to the video recording, and upon the watermark patterns being sent to the device, the recording can incorporate them while the recording is still being performed.

In some embodiments, the patterns may take the form of instructions to a user of the camera and/or device to perform one or more operations with respect to the recording. For example, the instructions may involve the user shaking or moving the camera or device in some specified manner which has been generated in a random or pseudorandom fashion by the system for watermarking purposes. In some embodiments, patterns may take the form of light flashes, intermittent beeps or tones, or other patterns which may be detectable within the recorded video.

In some embodiments, the patterns may cause some sort of visual or audio results to occur in the recorded video output in a distinct and unique way when compared to other patterns. In such embodiments, each generated pattern is unique and differs from the other generated patterns in terms of the results present in the recorded video.

At step 206, the system receives cryptographic representations of one or more video content segments from the video content being recorded. In some embodiments, upon the completion of or concurrent to the video being recorded at the camera or device, a cryptographic representation is generated for different clips or segments of the video content. In some embodiments, the cryptographic representation is a progressive hash (i.e., a cryptographically scrambled representation of the data) generated using a hashing algorithm, or other suitable one-way function. In some embodiments, the hash of the video content segment is generated in such a way that a person or device can later ensure that the video content segment being accessed was hashed at a particular time and recorded at a particular time. For example, upon running the same segment of video content through the hashing algorithm again may result in different hashes if anything has changed in the file's audio or video data, indicating possible manipulation of the video content.

In some embodiments, the algorithm for generating the cryptographic representations of the video content segments is executed on the camera or device with which the video was recorded. In other embodiments, the algorithm is executed on the remote server, a local device communicatively coupled to the camera or device, or some other device or server. In some embodiments, the video content segments are automatically generated during recording of the video. In other embodiments, the segments are generated from the video content file after recording. The segments may be equal pre-specified portions of the video content, or may be segmented according to one or more processes according to optimization of computing resources, available network bandwidth, or some other parameter(s).

At optional step 208, the system embeds the cryptographic representations of the video content segments within a blockchain. In some embodiments, the blockchain is a public blockchain. In other embodiments, the blockchain is a semi-private blockchain. In some embodiments, the blockchain may be a pre-specified blockchain or one that is designated or generated dynamically according to one or more criteria. In some embodiments, the blockchain may operate according to a blockchain platform that includes a web platform capable of presenting pieces of data corresponding to the cryptographic representations. For example the web platform may provide details regarding which segments of video content have matching cryptographic representations in the blockchain, and which don't have matching cryptographic representations. In some embodiments, the blockchain or web platform associated with the blockchain may additionally provide information regarding when a file was created, hashed, submitted to the blockchain, or any other suitable information. Since these representations are stored in a time-stamped, accessible blockchain record, the blockchain can be used to verify video content. In some embodiments, authentication information about video content is accessible to one or more users with access to the blockchain who are able to independently verify authenticity of video content in this fashion. In some embodiments, applications, smart contracts, or other programs can independently verify authenticity of video content in this fashion. In some embodiments, a public record or log, or semi-private record or log, of the cryptographic representations of the video content are visible to one or more independent parties who can verify video authenticity at a later time without needing to have any one organization or entity vouch for the authenticity as a potential bad actor.

In some embodiments, instead of embedding the cryptographic representations within a blockchain, the system can set up an automated or semi-automated publishing of the crytographic representations in a public or semi-public medium or record.

At step 210, the system receives one or more additional video content segments. In some embodiments, the system receives complete recorded video content in a single unsegmented file, or complete recorded video content in multiple segmented files. In some embodiments, the system receives one or more video segments but not full video content. In situations where the server or device detects a lack of network bandwidth in some fashion, or other lack of computing or network resources for uploading a prohibitively large amount of video content, the device can be configured to send video content segments in a dynamic and/or optimized way to mitigate the lack of resources, or cache content for later upload to the server.

At step 212, the system verifies whether the received video content segments correspond to the cryptographic representations of the video content segments. In some embodiments, the cryptographic representations of the video content segments are embedded within a blockchain, and the verification is performed with respect to the embedded representations within the blockchain. A given piece of video content will not be verifiable within the blockchain until video content segments or the full video content are uploaded to the server and the server receives them. Once the content is uploaded, the system can perform verification according to one or more verification algorithms which compare the cryptographic representations of the video content segments within the blockchain to cryptographic representations of the uploaded video content segments which are generated using the same algorithm (e.g., the same hashing algorithm). If the cryptographic representations (e.g., hashes) do not match, then the content is potentially not original or authenticated content. If it does, then the content has a high likelihood of being original and authenticated content.

In some embodiments, the system can be configured for regular or semi-regular audits from one or more third parties or independent entities with respect to published or non-published cryptographic representations.

At step 214, the system processes the video content segments to analyze whether the watermarking within the video content segments matches the generated patterns sent to the device. In some embodiments, the system performs this processing according to any of a number of detection algorithms. In some embodiments, one or more motion detection algorithms can be used, such as vibration detection algorithms, for detecting the vibration or motion patterns of the signature or watermark in the video content, which is then compared to the generated patterns which were generated by the system. In some embodiments, the system may additionally or alternatively use sound detection algorithms to detect sound caused by vibration or motion of the signature or watermark within the video, which is then compared to the generated patterns which were generated by the system. Many other such suitable detection and comparison algorithms may be contemplated.

In some embodiments, vibration patterns may be detected according to the oscillations in the position of the camera or device due to the vibration, which are manifested in the resulting recorded video content. In some embodiments, motion detection algorithms in addition to frequency detection algorithms may be employed to detect such oscillations within the recorded video. For example, the frequency of left-right motion in a video may be matched by the system with the frequency of the vibration patterns that were sent by the system when the video was being recorded.

In some embodiments, one or more machine learning and/or deep learning processes are employed in order to verify that the watermarks or signatures are present in the video. In some embodiments, a sufficiently large dataset of watermark patterns (e.g., vibration patterns and/or other suitable patterns) is used to train one or more machine learning and/or deep learning models. In some embodiments, the dataset of patterns is tied to a dataset of cases where the patterns match, and a dataset of cases where the patterns do not match. In conjunction with the cases, the machine learning and/or deep learning models iteratively improve based on output feedback and acquire an understanding of when patterns will match and when they will not match. In such processes, a database of scenarios where they are known fakes (i.e., where the patterns don't match) and a database of scenarios where they are known, verified, correct non-fakes can be leveraged as training data for machine learning and/or deep learning algorithms. In some embodiments, such databases can be continuously updated and added to as additional cases and scenarios are generated over the course of ordinary operation of the systems and methods herein. Many potential machine learning and/or deep learning models may be contemplated and used, separately or in combination.

At optional step 216, the system sends an authentication result to one or more devices. In some embodiments, the authentication result may present information about the results of authentication of video content within a blockchain, verification of watermarks present in the video, or both. In some embodiments, the device or devices receiving authentication results can be associated with, e.g., a requesting user or organization seeking to authenticate a given video, or as part of a program, piece of code, application, or smart contract requesting authentication of video content.

In some embodiments, the results might be partly or wholly in the form of the cryptographic representations (e.g., hashes) of the video content, to allow for independent verification from one or more parties that the representations match the video files and are in the database. In some embodiments, the results might be partly or wholly in the form of the series of generated patterns or other external inputs that are present in the video along with matching patterns or inputs within a database, to allow for independent verification from one or more parties that the patterns present in the video match the generated patterns.

4. Examples

One possible example of the systems and methods herein is presented for illustration purposes. In a hypothetical scenario, Mary Jane takes regular video on her smartphone of a high-profile politician engaged in an illegal activity. She later serves as a witness in a court trial of the politician, and the video is introduced as evidence. The politician testifies that the video is "definitely a deepfake", that he never engaged in the illegal activity, and that the technology is capable of such convincing fake video that the footage looks real. Efforts in the past to detect deepfakes were unable to prove that video was not doctored beyond a shadow of a doubt or to a convincing enough degree. No matter how good the detection is, there is still the possibility that the video could have been doctored.

To eliminate this possibility of the deepfake detection not being accurate beyond a shadow of a doubt, authentication of the video can be performed from the instant Mary Jane starts recording. This authentication can include the watermarking via generated patterns, as described above. The authentication can also include cryptographic representations, such as hashes, of the video files, which make any tampering with the video files instantly apparent. The authentication can optionally also include these cryptographic representations being embedded within a blockchain, which provides accountability and transparency such that each node of the blockchain can independently verify whether the video has been tampered with or not since the moment or soon after the moment it is recorded. Such a method could optionally provide not just Mary Jane as a witness, but multiple witnesses testifying that the video is real and authentic.

The above example illustrates, among other things, that it can be hard to prove a positive when it comes to deepfakes and other videos—i.e., to prove that the video is not a fake, but is affirmatively authentic. One way to prove the video is affirmatively authentic and real is via the video authentication methods described herein.

Figure 3:
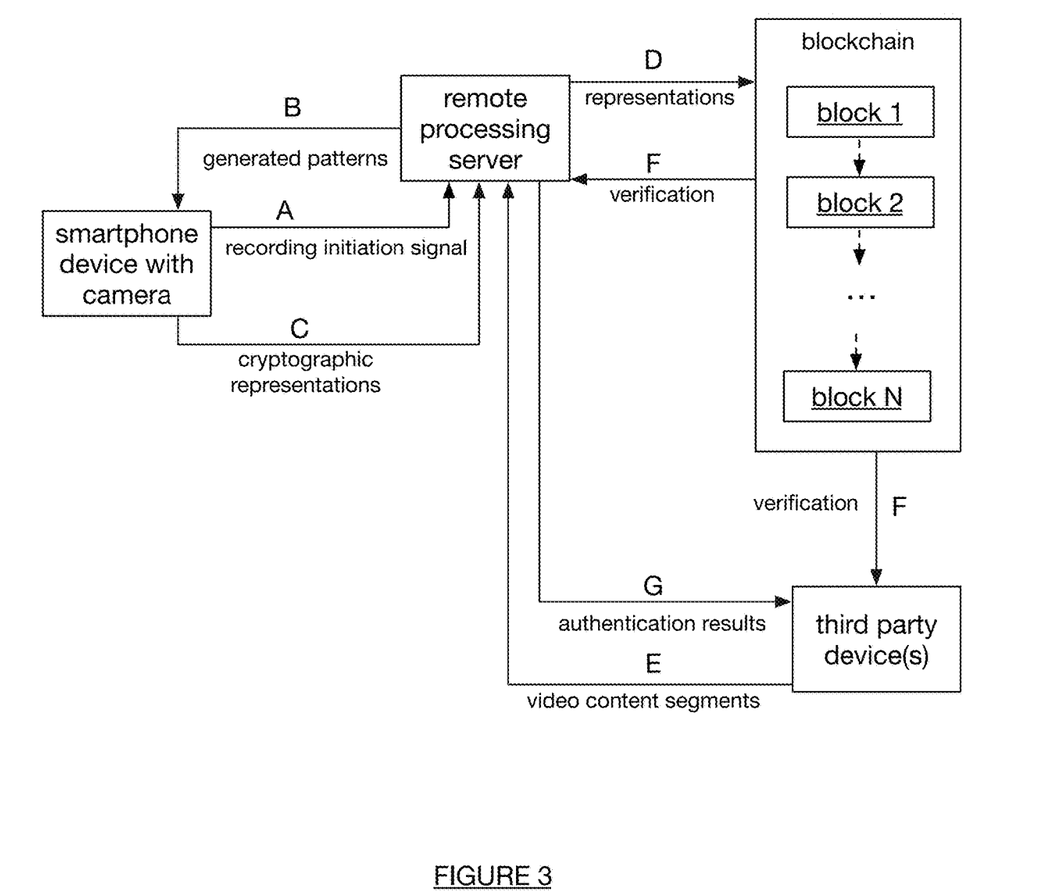
FIG. 3 is a flowchart representation of one possible example of video content authentication, in accordance with some embodiments.

FIG. 3 is a flowchart representation illustrating one possible example of video authentication, in accordance with some embodiments. The above hypothetical situation is used for illustrative purposes. At step A, as Mary Jane initiates the video recording of the politician on her smartphone device, her video recording application and/or her smartphone device automatically sends a recording initiation signal to a remote processing server configured for video authentication. At step B, The remote processing server responds by sending randomly generated vibration patterns to Mary Jane's smartphone device. Her smartphone device then receives the generated patterns and incorporates them into the video recording as the recording is taking place, which involves the smartphone vibrating according to the generated patterns. The vibration moves the device and generates sound in such a way that is sufficiently unique to constitute a watermark for the video. As soon as the recording is complete (e.g., Mary Jane presses a button to stop the recording, the recording automatically stops, or some other recording termination event occurs), the smartphone device generates smaller video content segments from the large recording, and generates cryptographic representations of the video content segments from the hashes. At step C, the smartphone device sends the cryptographic representations to the processing server. At step D, the processing server embeds the cryptographic representations in a public blockchain. Each sequential block in the blockchain (e.g., Block 1, Block 2, . . . , Block N) contains both the previous hash information as well as the current hash information. At step E, one or more third party device(s) send video content segments (potentially unrelated to the previously generated content segments) to the remote processing server. The third party device(s) may be, for example, an independent third party device used by the court and/or an expert witness which is tasked with verifying whether some video content segments are authentic. At step F, the remote processing server verifies whether the cryptographic representations of the video content segments embedded in the blockchain, which are retrieved from the blockchain by the remote processing server, correspond to the video content segments sent in step E by the third party device(s). If the video content segments are not identical to the original video content segments, then the hashes of the two sets of video content segments will not correspond and no match is made. If a match is made, then the remote processing server processes the video content segments to detect whether any generated patterns detected in the video content segments match the generated patterns that were generated by the remote processing server earlier. Optionally, one or more third party device(s) can additionally or alternatively independently verify from the blockchain whether a match is made. At step G, authentication results are sent to one or more third party device(s), which may or may not include the third party device(s) that sent the video content segments earlier. If the authentication results return a match for the video content segments, then Mary Jane's video can be verified as authentic, original, and free of doctoring or manipulation.

Figure 4:
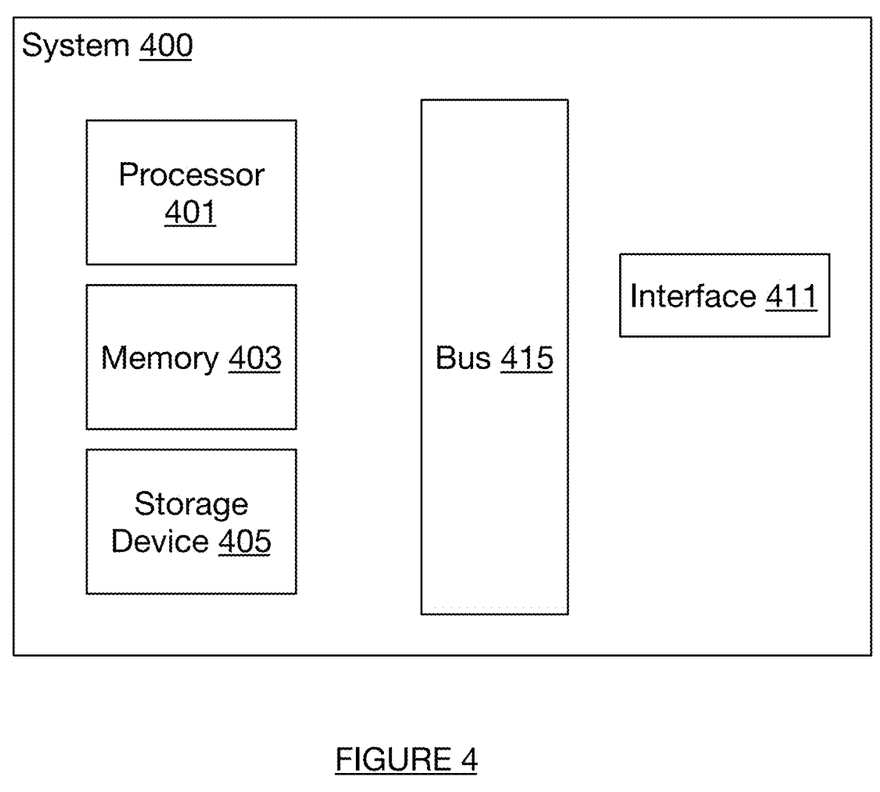
FIG. 4 illustrates one example of a computing device, configured in accordance with some embodiments.

FIG. 4 illustrates one example of a computing device. According to various embodiments, a system 400 suitable for implementing embodiments described herein includes a processor 401, a memory module 403, a storage device 405, an interface 411, and a bus 415 (e.g., a PCI bus or other interconnection fabric.) System 400 may operate as variety of devices such as video capture devices, server systems, database systems, or any other device or service described herein. Although a particular configuration is described, a variety of alternative configurations are possible. The processor 401 may perform operations such as those described herein. Instructions for performing such operations may be embodied in the memory 403, on one or more non-transitory computer readable media, or on some other storage device. Various specially configured devices can also be used in place of or in addition to the processor 401. The interface 411 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of video authentication. However, the techniques of the present invention apply to a wide variety of fields. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the disclosure without departing from the scope of this disclosure defined in the following claims.

I claim:

1. A method for providing authentication of video content, comprising:
    receiving, at a server, a recording initiation signal in relation to video content being recorded on a device, wherein the device is configured for video recording;
    sending one or more generated patterns to the device for audio and/or visual watermarking of the video content being recorded, the one or more generated patterns being vibration patterns corresponding to vibration capabilities of the device;
    receiving, at the server, cryptographic representations of one or more video content segments from the video content being recorded;
    embedding the cryptographic representations of the video content segments within a blockchain;
    receiving, at the server, one or more additional video content segments;
    verifying whether the received video content segments correspond to the cryptographic representations of the video content segments by verifying whether the received video content segments correspond to the embedded cryptographic representations of the video content segments within the blockchain; and
    processing the received video content segments to analyze whether the watermarking within the received video content segments match the generated patterns sent to the device.

2. The method of claim 1, wherein the one or more generated patterns are generated according to one or more random and/or pseudorandom pattern generation elements.

3. The method of claim 1, further comprising generating the cryptographic representations of the video content.

4. The method of claim 1, wherein the cryptographic representations of the video content are hashes of the video content.

5. The method of claim 1, wherein the generated patterns are sent to the device in real time or substantially real time concurrent to the video content being recorded.

6. The method of claim 1, further comprising caching one or more video content segments for receiving and/or processing at a later time.

7. The method of claim 1, wherein processing the received video content segments is performed according to one or more machine learning and/or deep learning methods.

8. The method of claim 1, wherein processing the received video content segments is performed according to one or more motion detection and/or sound detection algorithms.

9. The method of claim 1, wherein processing and/or verification of the received video content segments is performed in real time or substantially real time concurrent to the video segments being received.

10. A system for providing authentication of video content, comprising:
    a communications interface configured to communicate with one or more remote devices; and
    a processor configured to:
        receive, at a server, a recording initiation signal in relation to video content being recorded on a device, wherein the device is configured for video recording;
        send one or more generated patterns to the device for audio and/or visual watermarking of the video content being recorded, the one or more generated patterns being vibration patterns corresponding to vibration capabilities of the device;
        receive, at the server, cryptographic representations of one or more video content segments from the video content being recorded;
        embed the cryptographic representations of the video content segments within a blockchain;
        receive, at the server, one or more additional video content segments;
        verify whether the received video content segments correspond to the cryptographic representations of the video content segments by verifying whether the received video content segments correspond to the embedded cryptographic representations of the video content segments within the blockchain; and
        process the received video content segments to analyze whether the watermarking within the received video content segments match the generated patterns sent to the device.

11. The system of claim 10, wherein the one or more generated patterns are generated according to one or more random and/or pseudorandom pattern generation elements.

12. The system of claim 10, wherein the processor is further configured to:
    generate the cryptographic representations of the video content.

13. The system of claim 10, wherein the cryptographic representations of the video content are hashes of the video content.

14. The system of claim 10, wherein the generated patterns are sent to the device in real time or substantially real time concurrent to the video content being recorded.

15. The system of claim 10, wherein processing the received video content segments is performed according to one or more machine learning and/or deep learning methods.

16. A non-transitory computer readable medium having instructions stored thereon for performing a method, the method comprising:

receiving, at a server, a recording initiation signal in relation to video content being recorded on a device, wherein the device is configured for video recording;

sending one or more generated patterns to the device for audio and/or visual watermarking of the video content being recorded, the one or more generated patterns being vibration patterns corresponding to vibration capabilities of the device;

receiving, at the server, cryptographic representations of one or more video content segments from the video content being recorded;

embedding the cryptographic representations of the video content segments within a blockchain;

receiving, at the server, one or more additional video content segments;

verifying whether the received video content segments correspond to the cryptographic representations of the video content segments by verifying whether the received video content segments correspond to the embedded cryptographic representations of the video content segments within the blockchain; and processing the received video content segments to analyze whether the watermarking within the received video content segments match the generated patterns sent to the device.

\* \* \* \* \*